(12) United States Patent
Deboard et al.

(10) Patent No.: US 11,331,660 B2
(45) Date of Patent: May 17, 2022

(54) DIGITAL DISPENSE SYSTEM

(71) Applicant: Funai Electric Co., Ltd., Osaka (JP)

(72) Inventors: Bruce A. Deboard, Lexington, KY (US); John Glenn Edelen, Lexington, KY (US); Michael A. Marra, III, Lexington, KY (US); Sam Norasak, Lexington, KY (US)

(73) Assignee: FUNAI ELECTRIC CO. LTD.

( * ) Notice: Subject to any disclaimer, the term of this patent is extended or adjusted under 35 U.S.C. 154(b) by 344 days.

(21) Appl. No.: 16/416,352

(22) Filed: May 20, 2019

(65) Prior Publication Data

US 2020/0215531 A1 Jul. 9, 2020

Related U.S. Application Data

(60) Provisional application No. 62/788,290, filed on Jan. 4, 2019.

(51) Int. Cl.
*B01L 3/02* (2006.01)
*B01L 3/00* (2006.01)
*G01N 35/02* (2006.01)

(52) U.S. Cl.
CPC ....... *B01L 3/0241* (2013.01); *B01L 3/502784* (2013.01); *G01N 35/028* (2013.01); *B01J 2219/00315* (2013.01); *B01L 3/5085* (2013.01); *B01L 2400/04* (2013.01)

(58) Field of Classification Search
CPC .............. B01L 3/0241; B01L 3/502784; B01L 3/5085; B01L 2400/04; B01L 1/52; B01L 3/0268; B01L 2200/143; B01L 9/523; B01L 2300/0627; B01L 2300/023; G01N 35/028; G01N 2035/1041; G01N 35/1011; G01N 35/00871; G01N 2035/0486; G01N 2035/0422; G01N 35/109; G01N 35/1065; G01N 1/31; G01N 2001/317; B01J 2219/00315
See application file for complete search history.

(56) References Cited

U.S. PATENT DOCUMENTS

| | | | | |
|---|---|---|---|---|
| 6,001,309 | A | * | 12/1999 | Gamble ............... B01J 19/0046 347/19 |
| 6,547,358 | B1 | | 4/2003 | Tanaka et al. |
| 6,627,157 | B1 | | 9/2003 | Doktycz et al. |
| 7,135,146 | B2 | | 11/2006 | Johnson et al. |
| 7,199,809 | B1 | | 4/2007 | Lacy et al. |

(Continued)

FOREIGN PATENT DOCUMENTS

JP 2008151594 A * 7/2008

*Primary Examiner* — Jennifer Wecker
*Assistant Examiner* — Oyeleye Alexander Alabi
(74) *Attorney, Agent, or Firm* — Luedeka Neely Group, PC

(57) ABSTRACT

A digital dispense system for preparing and analyzing a plurality of samples. The system includes two or more fluid droplet ejection devices. Each fluid droplet ejection device contains a fluid droplet ejection cartridge containing at least one fluid to be dispensed. The fluid droplet ejection cartridge is attached to a translation mechanism for moving the fluid droplet ejection cartridge back and forth over a sample holder in an x direction. A sample tray translation mechanism is provided for moving a sample tray along a production path in a y direction orthogonal to the x direction through the two or more fluid droplet ejection devices.

20 Claims, 11 Drawing Sheets

(56) References Cited

U.S. PATENT DOCUMENTS

| | | |
|---|---|---|
| 7,401,879 B2 | 7/2008 | Isono et al. |
| 7,568,779 B2 | 8/2009 | Soma |
| 7,909,424 B2 | 3/2011 | Giri et al. |
| 8,201,913 B2 | 6/2012 | Govyadinov et al. |
| 8,210,633 B2 | 7/2012 | Suzuki |
| 8,540,332 B2 | 9/2013 | Shibata |
| 8,807,676 B2 | 8/2014 | Yoshida |
| 8,959,448 B2 | 2/2015 | Cappione et al. |
| 9,075,034 B2 | 7/2015 | Glauser et al. |
| 9,199,463 B2 | 12/2015 | Nishikawa |
| 9,224,952 B2 | 12/2015 | Harjee et al. |
| 10,139,319 B2 | 11/2018 | Kubota et al. |
| 2003/0026737 A1* | 2/2003 | Inoue ............... B01L 3/0268 422/400 |
| 2005/0238544 A1* | 10/2005 | Briscoe ............ G01N 35/1011 422/562 |
| 2006/0057710 A1* | 3/2006 | Ishiura ............... C12M 41/36 435/287.3 |
| 2006/0153621 A1 | 7/2006 | Manning |
| 2007/0056351 A1* | 3/2007 | Curtis ................ G01F 25/003 73/1.74 |
| 2007/0185657 A1 | 8/2007 | Lacy et al. |
| 2008/0305969 A1 | 12/2008 | Dijksman et al. |
| 2009/0033692 A1* | 2/2009 | Giri ..................... B41J 2/175 347/6 |
| 2009/0117620 A1* | 5/2009 | Fritchie ........... G01N 35/0098 435/91.1 |
| 2010/0199788 A1 | 8/2010 | Ayliffe et al. |
| 2013/0105042 A1* | 5/2013 | Brown .............. B01F 13/1055 141/9 |
| 2014/0112839 A1 | 4/2014 | Richardson |
| 2015/0210075 A1* | 7/2015 | Nishikawa ............ B41J 2/145 347/47 |
| 2016/0238623 A1 | 8/2016 | Sun et al. |
| 2018/0272345 A1* | 9/2018 | Higuchi ............. B01L 3/0268 |
| 2018/0272770 A1 | 9/2018 | Tobita |
| 2019/0212350 A1* | 7/2019 | Wolton ................. B60S 1/68 |
| 2021/0165007 A1* | 6/2021 | Nielsen .............. B01L 3/5085 |

\* cited by examiner

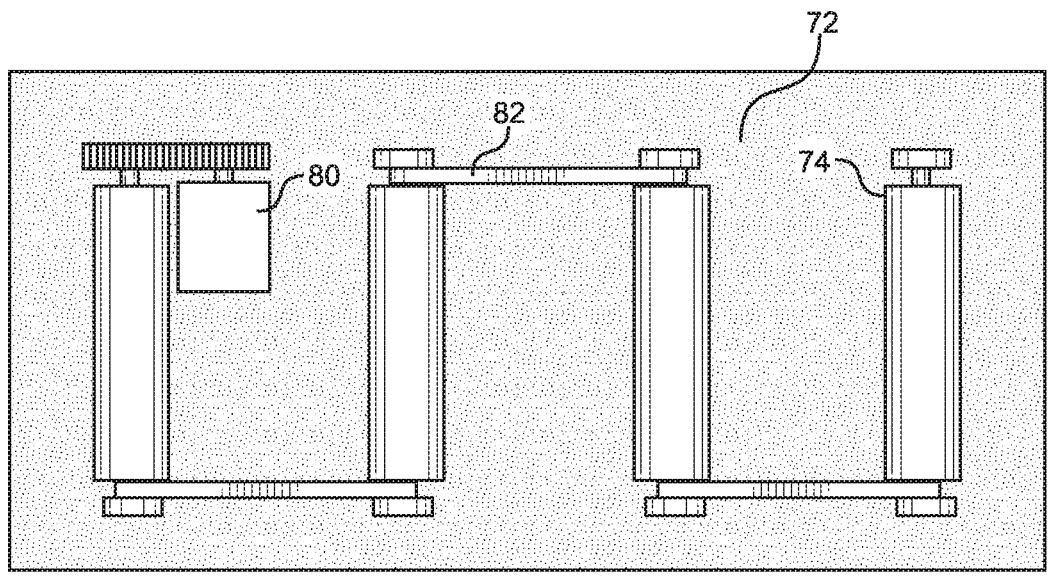
FIG. 20
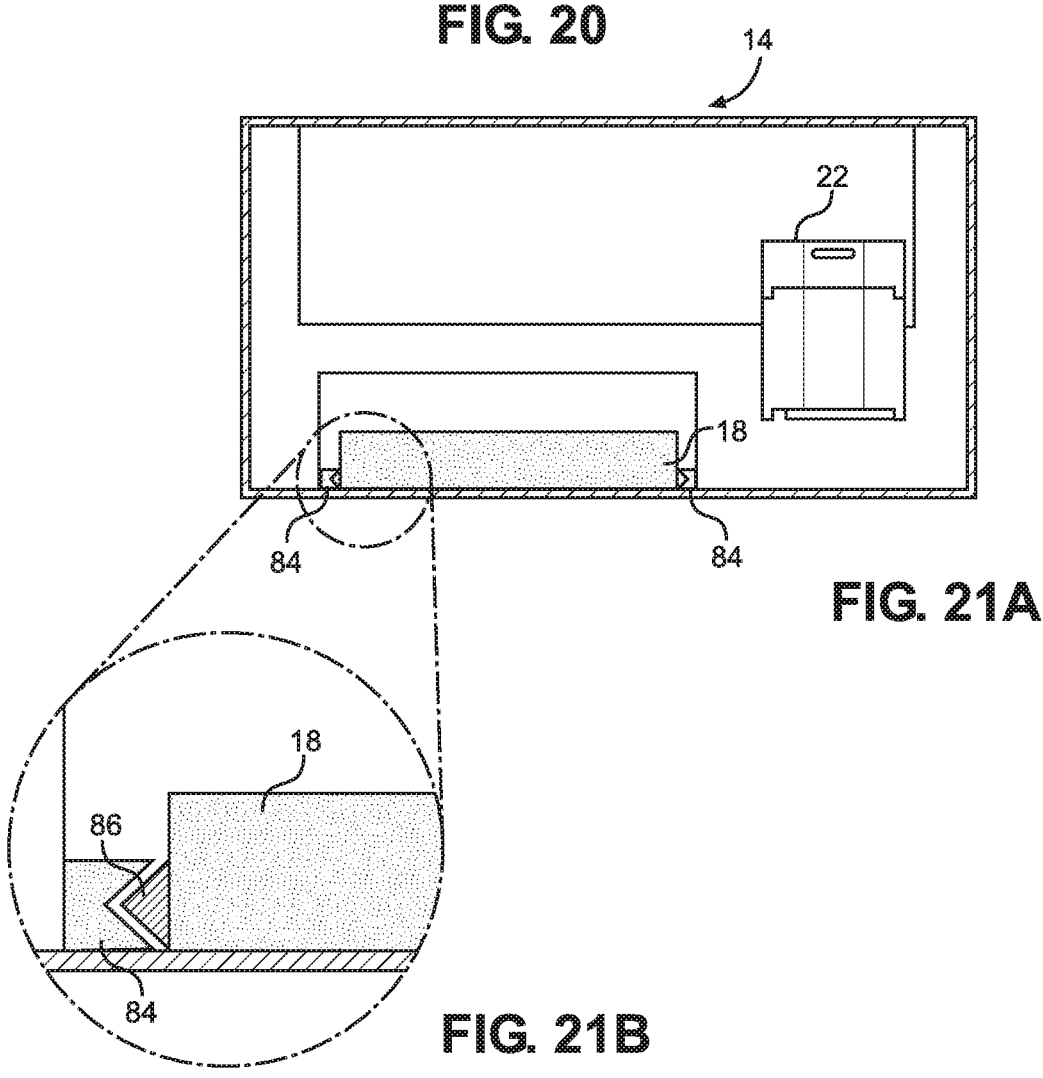
FIG. 21A
FIG. 21B

DIGITAL DISPENSE SYSTEM

RELATED APPLICATION

This application is related to provisional application Ser. No. 62/788,290, filed Jan. 4, 2019, now pending.

TECHNICAL FIELD

The disclosure is directed to analytical instruments and in particular to instruments that are used to dispense fluids for analytical purposes.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

Micro-well plates are typically used for many experiments and laboratory procedures. The process of filling the wells is often performed manually or using expensive lab equipment. In some cases, the wells are filled with hand operated pipettes. In other cased, high-end automated devices based on pipette technology are used to fill the well plates. Such automated devices accommodate an open well dispense head only. The open well dispense head is a dispense head where a small amount of fluid must be deposited into an opening in the dispense head before use. The fluid is typically deposited manually using a pipette or similar means. The dispense head is held stationary while moving the microplate in both X and Y directions. These high end devices are extremely expensive. Accordingly, there is a need for a digital dispense system that can be used in a wide variety of analytical situations for preparation, analysis and digital titration of samples that is much less expensive.

In view of the foregoing, an embodiment of the disclosure provides a digital dispense system for preparing and analyzing a plurality of samples. The system includes two or more fluid droplet ejection devices. Each fluid droplet ejection device contains a fluid droplet ejection cartridge containing at least one fluid to be dispensed. The fluid droplet ejection cartridge is attached to a translation mechanism for moving the fluid droplet ejection cartridge back and forth over a sample holder in an x direction. A sample tray translation mechanism is provided for moving a sample tray along a production path in a y direction orthogonal to the x direction through the two or more fluid droplet ejection devices.

In another embodiment there is provided a method for preparing and analyzing a plurality of samples in a micro-well plate. The method includes providing a digital dispense system for preparing and analyzing the plurality of samples. The digital dispense system contains two or more fluid droplet ejection devices. Each fluid droplet ejection device includes a fluid droplet ejection cartridge containing at least one fluid to be dispensed. The fluid droplet ejection cartridge is attached to a translation mechanism for moving the fluid droplet ejection cartridge back and forth over a sample holder in an x direction. A sample tray translation mechanism is provided for moving a sample tray containing a plurality of sample wells along a production path in a y direction orthogonal to the x direction through the two or more fluid droplet ejection devices. The sample tray is moved along the production path through the two or more fluid droplet ejection devices and fluid is deposited into the sample wells on the sample tray as the sample tray is moving through the two or more fluid droplet ejection devices.

Another embodiment provides a portable sample analysis laboratory. The portable analysis laboratory includes a digital dispense system, a glove box enclosure and a bag sealer for micro-well plate process and analysis. The digital dispense system contains two or more interconnected fluid droplet ejection devices, each fluid droplet ejection device containing a fluid droplet ejection cartridge containing at least one fluid to be dispensed, the fluid droplet ejection cartridge being attached to a translation mechanism for moving the fluid droplet ejection cartridge back and forth over a sample holder in an x direction. A sample tray translation mechanism is provided for moving a sample tray along a production path in a y direction orthogonal to the x direction through the two or more interconnected fluid droplet ejection devices.

In some embodiments, the sample tray includes an adapters for holding a micro-well plate containing a plurality of sample wells.

In other embodiments, the two or more fluid droplet ejection devices are mechanically connected to one another using clamps.

In some embodiments, the sample tray translation mechanism includes at least one track edge containing triangular teeth for intermeshing with a gear of a stepping motor. In still other embodiments, the sample tray moves between a pair of guidance tracks attached to the two or more fluid droplet ejection devices to accurately guide the sample tray along the production path through the two or more interconnected fluid droplet ejection devices.

In another embodiment, each of the two or more fluid droplet ejection devices is electrically connected to an adjacent fluid droplet ejection device to provide logic information transfer between the two or more interconnected fluid droplet ejection devices. In still another embodiment, each of the two or more fluid droplet ejection devices contains a wireless transmitter and receiver for providing logic information transfer between the two or more fluid droplet ejection devices.

In some embodiments, the system includes sensors along the production path to index the tray position as it moves through the two or more fluid droplet ejection devices. In other embodiments, the system includes a memory, a processor, and an input device, for controlling fluid droplet ejection from the two or more interconnected fluid droplet ejection devices. In still other embodiments, the two or more fluid droplet ejection devices are programmed to deposit fluid into the plurality of sample wells on the sample tray as the sample tray moves along the production path.

In another embodiment, only one fluid is deposited from each of the two or more fluid droplet ejection devices into the sample wells as the sample tray moves along the production path.

In other embodiments, the sample tray is moved sequentially along the production path from a first end to a second end of the production path.

BRIEF DESCRIPTION OF THE DRAWINGS

FIG. 20 is a bottom view, not to scale, of a conveyor system for the transportation system of FIGS. 17A-17B.

FIGS. 21A-21B are schematic illustrations, not to scale, of a sample tray guide for the digital dispense system of FIG. 1.

DETAILED DESCRIPTION OF EXEMPLARY EMBODIMENTS

Figure 1:
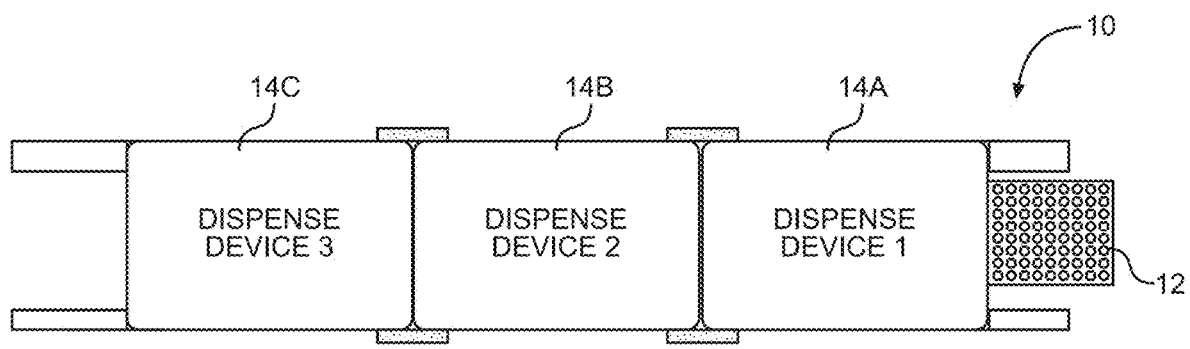
FIG. 1 is a schematic view, not to scale, of a digital dispense system according to an embodiment of the disclosure.
Figure 2:
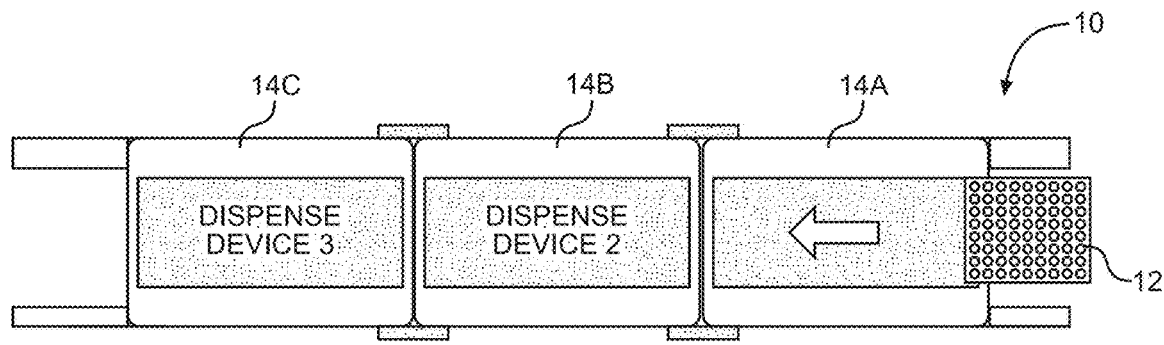
FIG. 2 is a schematic cut-away view, not to scale, of the digital dispense system of FIG. 1 showing movement of a micro-well plate therethrough.
Figure 3:
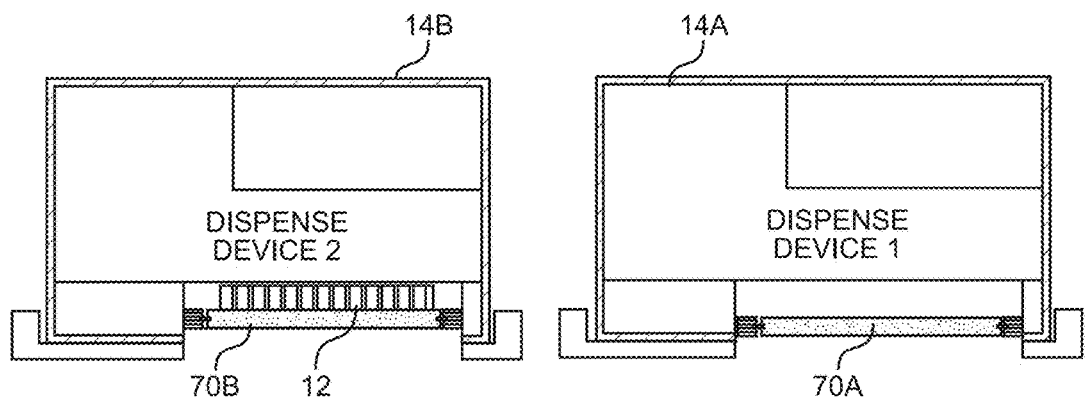
FIG. 3 is a side elevational view, not to scale, of two of the fluid droplet ejection devices showing the micro-well plate in one of the devices according to an embodiment of the disclosure.
Figure 4:
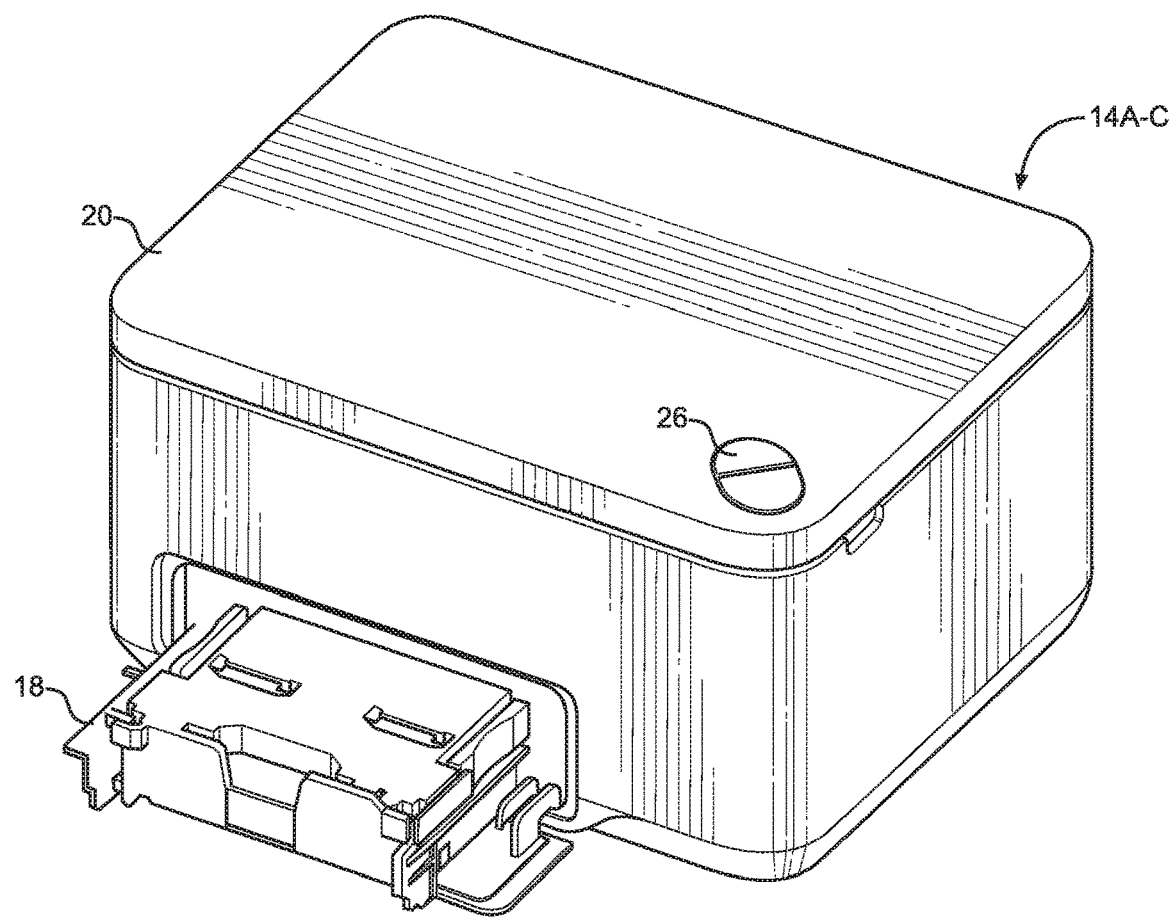
FIG. 4 is a perspective view, not to scale, of a fluid droplet ejection device for the digital dispense system of FIG. 1.
Figure 5:
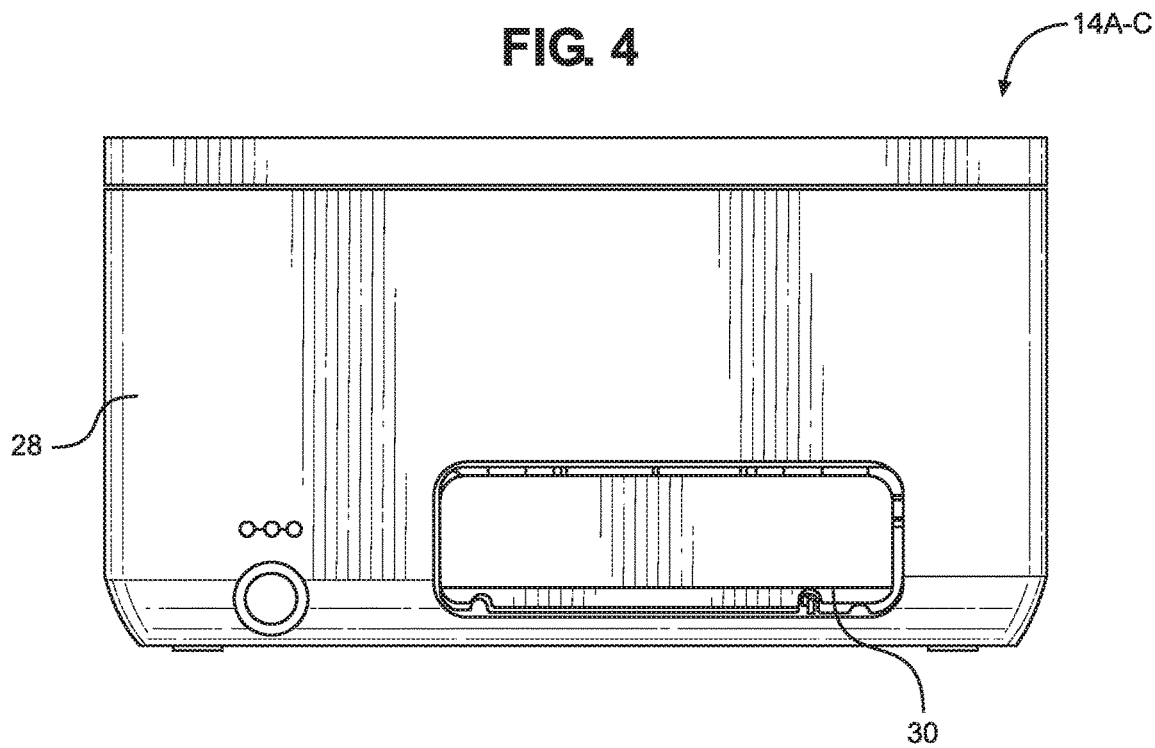
FIG. 5 is an elevational view, not to scale, of a back side of the fluid droplet ejection device of FIG. 4.
Figure 6:
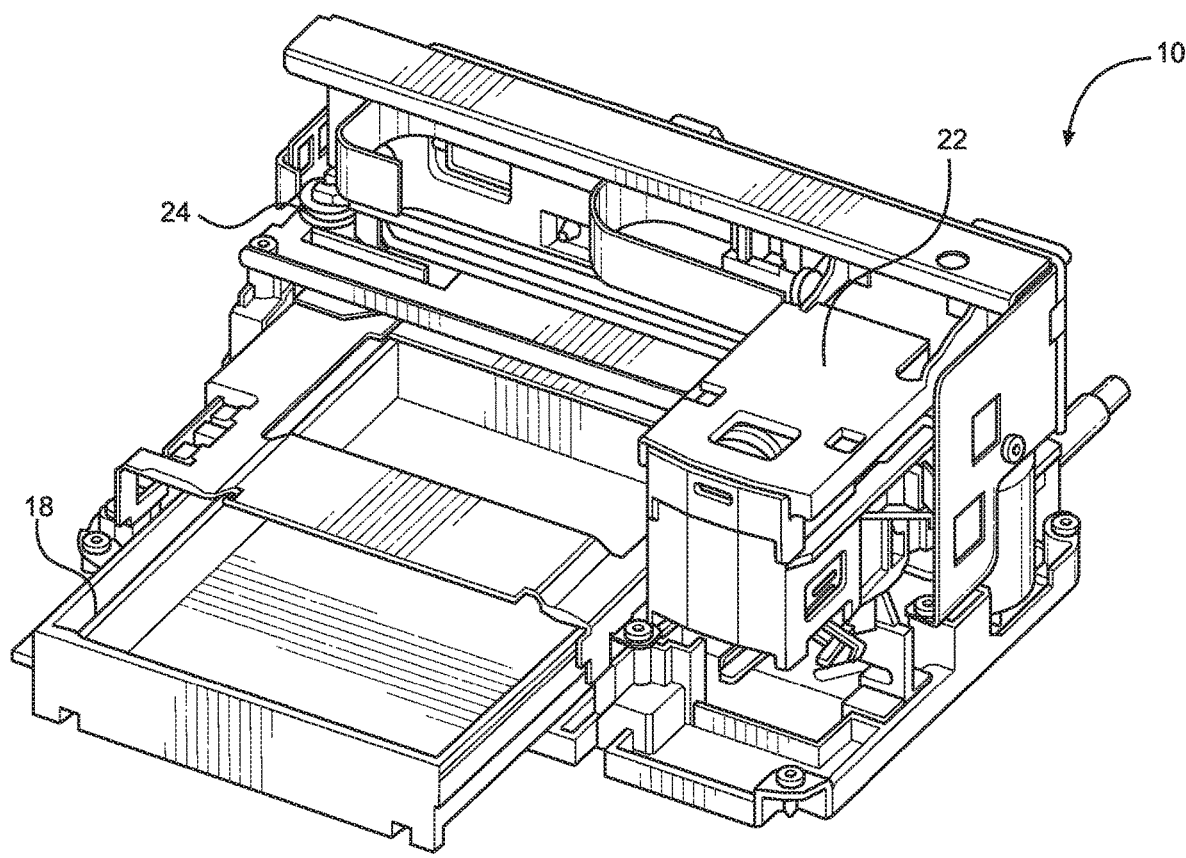
FIG. 6 is a perspective cutaway view, not to scale, of the fluid droplet ejection device of FIG. 4.

With reference to FIGS. 1-9 there is shown a digital dispense system 10 for dispensing fluids to a micro-well plate 12 for analysis of samples in wells of the micro-well plate 12. The system 10 includes two or more fluid droplet ejection devices 14A-14C (three shown) and a sample tray translation mechanism, described in more detail below. A partial plan view showing the movement of the micro-well plate 12 through the fluid droplet ejection devices of FIG. 1 is illustrated in FIG. 2. FIG. 3 is a schematic elevational end view of the fluid droplet ejection devices 14A and 14B showing movement of the micro-well plate 12 through fluid droplet ejection device 14B after exiting fluid droplet ejection device 14A. The sample tray translation mechanism 70 operates to move the micro-well plate 12 through each of the devices 14A and 14B.

Further details of the fluid droplet ejection device 14A-C and sample tray 18 for use with the system are illustrated in FIGS. 4-9. Each of the fluid droplet ejection devices 14A-C is based on the use of an ejection head and fluid cartridge 22 that moves back and forth in a first direction while the sample tray 18 containing the micro-well plate 12 moves in a second direction orthogonal to the first direction, as described in more detail below. The sample tray 18 may be adapted to hold both standard micro-well plates 12 as well as glass slides and other substances. However, for purposes of this disclosure, only a sample tray 18 for holding micro-well plates 12 will be described.

Each of the fluid droplet ejection devices 14A-C includes a rectangular-prism-shaped box 20 containing a fluid droplet ejection head and fluid cartridge 22 and an ejection head movement mechanism 24 (FIG. 6) are contained in a rectangular prism-shaped box 18. An activation switch 26 is included on the box 20 for user activation of the device 14A-C. A rear side 28 of the box 20 includes an opening 30 for movement of the sample tray 18 through the box 20 in the second direction while fluid is being dispensed into the wells of the micro-well plate 12. The ejection head on the ejection head and fluid cartridge 22 may be selected from a wide variety of ejection head devices including, but not limited to, thermal jet ejection heads, bubble jet ejection heads, piezoelectric ejection heads, and the like.

Figure 7:
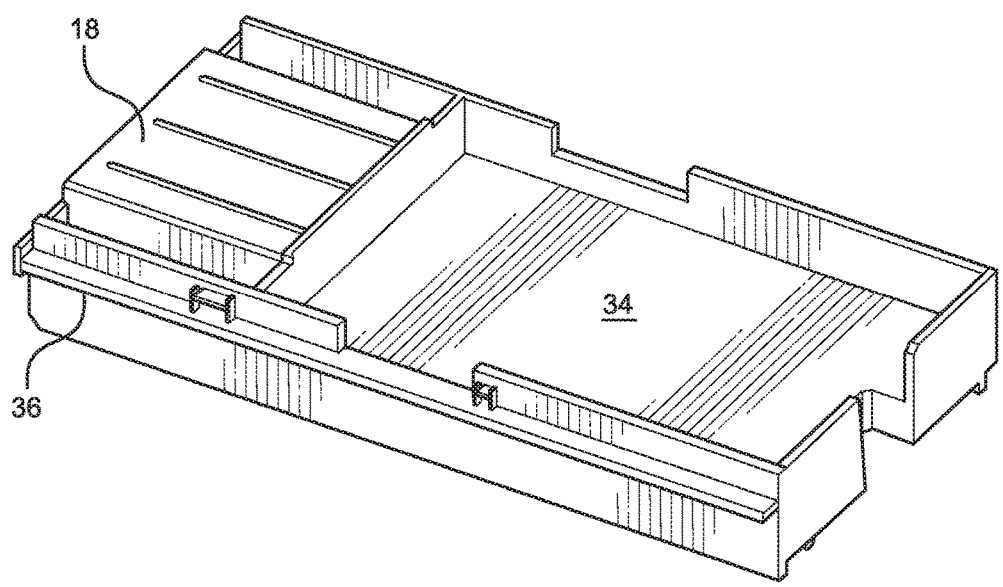
FIG. 7 is a perspective view, not to scale, of a sample tray for holding micro-well plates for use with the digital dispense system of FIG. 1.
Figure 8:
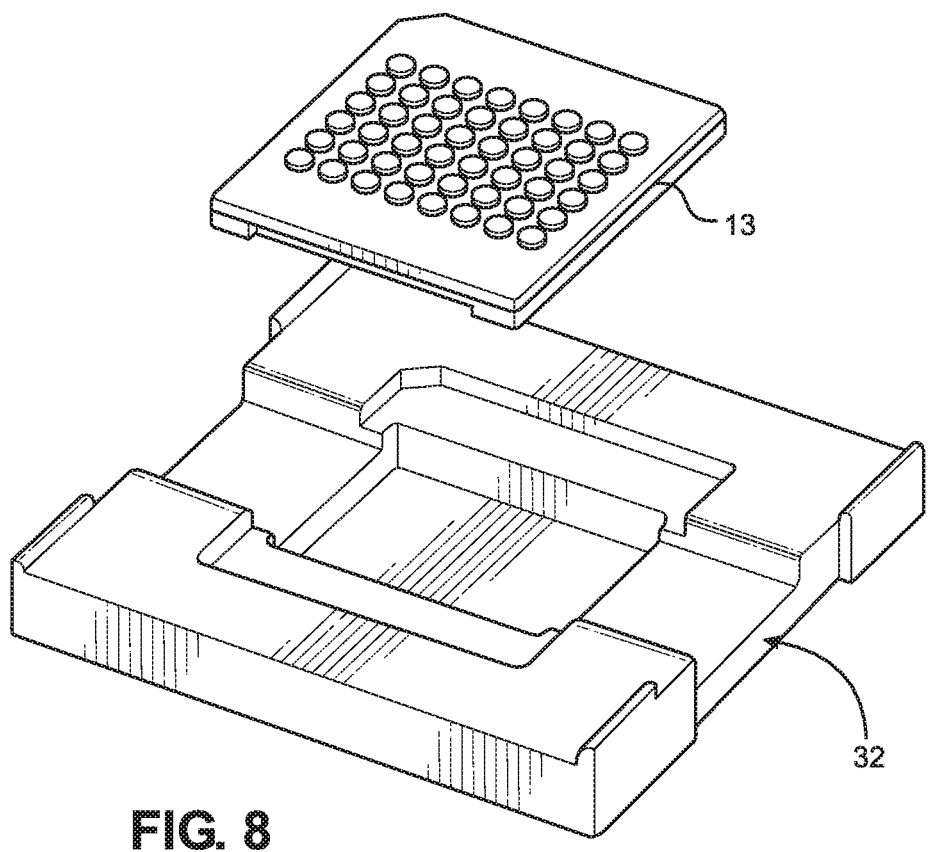
FIG. 8 is a perspective view, not to scale, of an adapter for a micro-well plate for use with a sample tray of FIG. 7.
Figure 9:
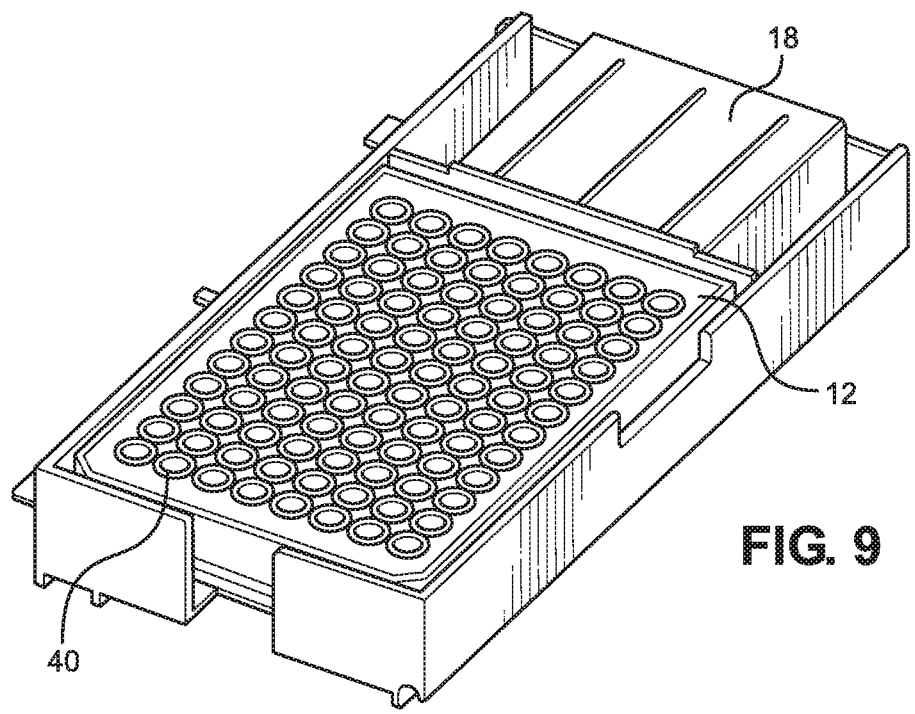
FIG. 9 is a perspective view, not to scale, of the sample tray of FIG. 7 holding a well plate adapter and micro-well plate for the digital dispense system of FIG. 1.

The sample tray 18 and an adapter 32 for the tray 18 are illustrated in FIGS. 7 and 8. The well plate adapter 32 is sized to hold a reduced-size micro-well plate 13. The sample tray 18 has an holder area 34 for holding a full-size well plate 12 or the adapter 32 for dispensing fluids onto the reduced-size micro-well plate 13. FIG. 9 illustrates a micro-well plate 12 in the holder area 34 of the sample tray 18. As shown in FIG. 7, sides of the tray 18 may include triangular teeth 36 for indexing the tray 18 in the second direction as the tray moves through the box 20.

Each fluid droplet ejection head and fluid cartridge 22 in the fluid droplet ejection devices 14A-C is adapted to make multiple passes on the micro-well plate 12 in order to deposit fluid into individual wells 40 of the micro-well plate 12. Each fluid droplet ejected from the ejection head and cartridge 22 may have a volume ranging from about 5 to about 20 pico-liters. In some cases, a single drop of fluid per well 40 is required. In other cases, up to 1,000,000 or more drops are required per micro-well plate 12. The fluid droplet ejection devices 14A-C are programmed to dispense a predetermined volume of fluid to over a defined area or number of wells 40.

For a given volume, the number of drops required to dispense the predetermined volume of fluid is defined as (volume/drop size). For example, if a drop size is selected as 10 pico-liters, and it is required to dispense 10 micro-liters onto the micro-well plate 12, then the ejection head and cartridge 22 will have to dispense $10/10^{e-6}$ or 1,000,000 drops onto the micro-well plate 12. Now that the number of drops is determined for the given volume, the area can be calculated. If the target area is a square that is 0.5 inches×0.5 inches, then the maximum number of drops that can be dispensed in that area with one pass of the ejection head and cartridge 22 can be calculated as follows:

$$Area = 0.5*0.5 = 0.25 \text{ inches}^2$$

$$\text{Maximum drops in one pass} = Area*(600 \times 1200) = 180,000 \text{ drops.}$$

Finally, the total number of passes required to spread this volume over the selected area can be calculated as follows:

$$1,000,000/180,000 = 5.56 \text{ passes.}$$

Accordingly, the ejection head 22 will need to make 5 full passes, and then a 'remainder' pass that is not entirely full to dispense the volume of fluid calculated over a given area while the micro-well plate 12 is disposed in each fluid droplet ejection device 14A-C. Each of the passes will spread the drops consistently over the area.

In an alternative embodiment, the fluid droplets are spread out equally amongst the 6 total passes. In this embodiment there is no remainder pass, just 6 passes of more or less equal fluid droplet volume.

In some application, each fluid droplet ejection device 14A-C includes a single ejection head and fluid cartridge 22 that includes a reservoir for holding a single fluid. In some embodiments, each fluid droplet ejection device 14A-C may include two or more ejection heads and fluid cartridges 22, each holding a single fluid, or a single ejection head and fluid cartridge 22 holding multiple fluids. However, in a preferred embodiment, each fluid droplet ejection device 14A-C contains a single ejection head and fluid cartridge 22 that contains a single fluid. In this way, multiple fluid droplet ejection devices 14A-C may be combined or daisy-chained together to simplify the deposition of different amounts of fluid from each ejection head and fluid cartridge 22, and to speed up the overall process of depositing fluids into the wells 40 of the micro-well plate 12. Use of a single fluid from each ejection head and fluid cartridges 22 reduces the possibility of cross-contamination of fluids from the ejection heads and simplifies the ejection head maintenance procedures. Each fluid droplet ejection device 14A-C may be programmed for maintenance for one particular fluid rather than for multiple fluids. When multiple fluids are used in a single ejection head and fluid cartridge 22, the maintenance procedure is optimized for the fluid requiring the most frequent maintenance thereby reducing the time the ejection head and fluid cartridge 22 is used to eject other fluids that may not require the same maintenance frequency. Use of a series of fluid droplet ejection devices 14A-C to deposit fluids onto a micro-well plate 12 enables the system 10 to skip or pass through fluid droplet ejection devices 14A-C that do not contain fluids that are suitable for use in preparing and analyzing the samples in the wells 40 of the micro-well plate 12.

Figure 10A:
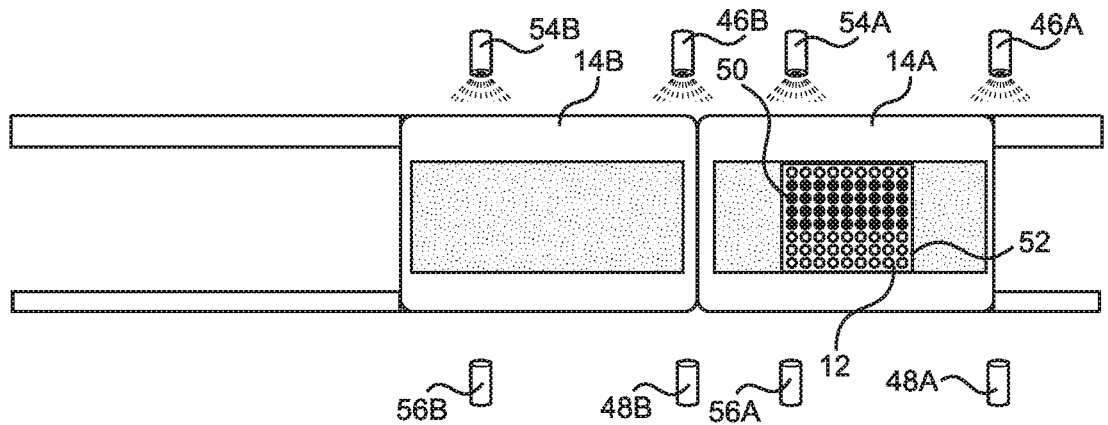
FIGS. 10A-10D are schematic illustrations of the movement of a micro-well plate through the digital dispense system of FIG. 1.

A simplified procedure for depositing fluids onto a well plate 12 using two interconnected fluid droplet ejection devices 14A and 14B is illustrated schematically in FIGS. 10A-10D. In FIG. 10A, the micro-well plate 12 is positioned and transported within the fluid droplet ejection device 14A as a first fluid is deposited in one or more wells 40 of the micro-well plate 12. When the first fluid is finished being deposited into the wells 40 of the micro-well plate 12, the fluid droplet ejection device 14A is deactivated and the micro-well plate 12 is transported from the fluid droplet ejection device 14A to fluid droplet ejection device 14B in the direction of arrow 42 in FIG. 10B. In some embodiments, the fluid droplet ejection devices 14A and 14B are not connected to one another mechanically, but are electrically connected to one another for fluid dispense control. In this case, the micro-well plate 12 may be moved manually from one fluid droplet ejection device 14A to the next fluid droplet ejection device 14B.

Figure 10B:
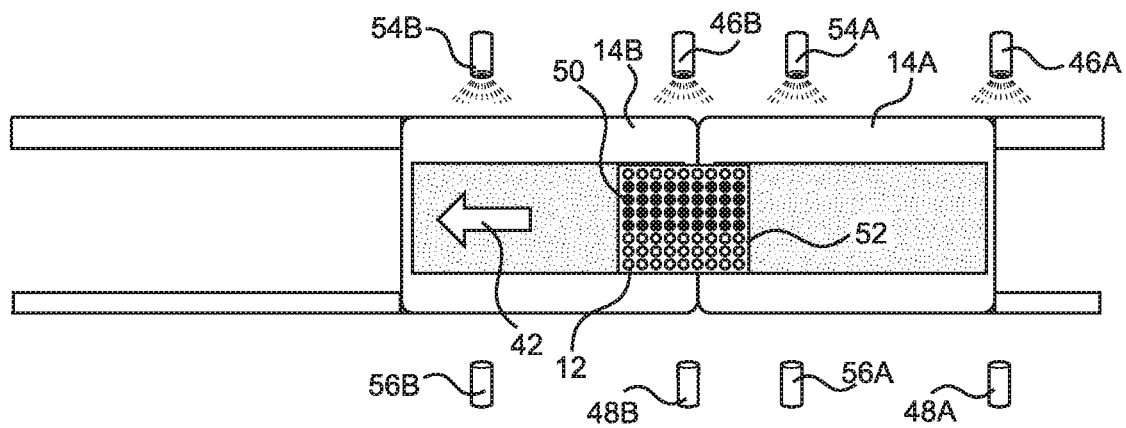
Figure 10C:
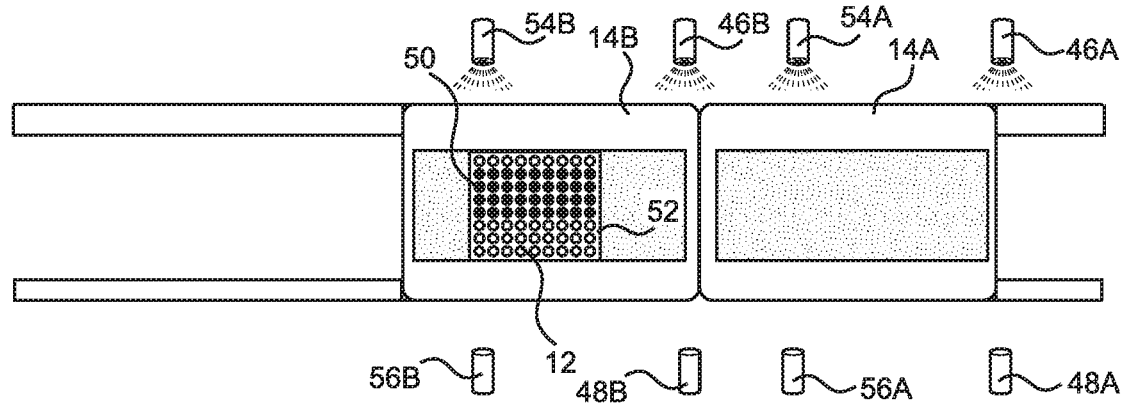
Figure 10D:
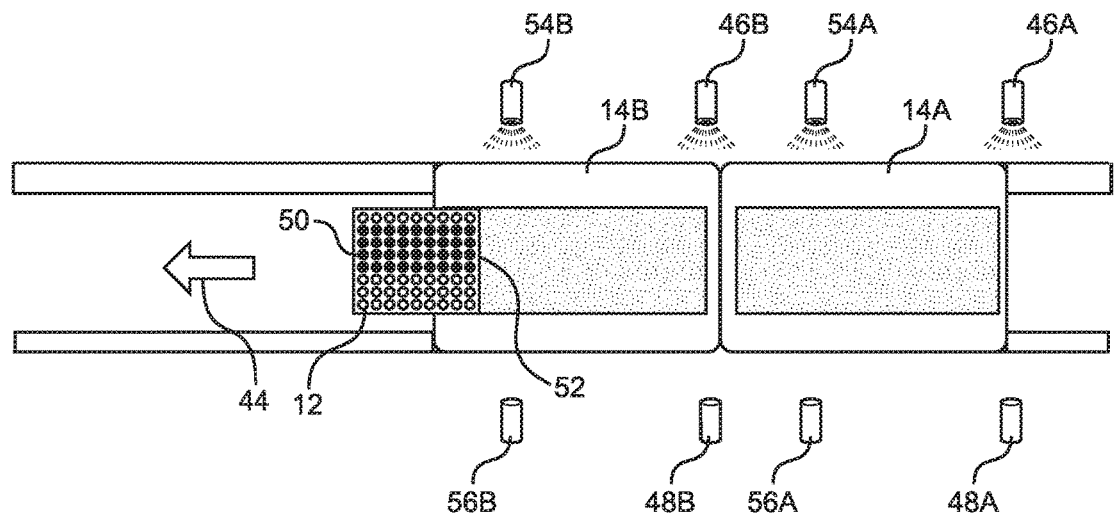

Once the micro-well plate 12 has reached a predetermined starting position within the fluid droplet ejection device 14B, the fluid droplet ejection device 14B is activated to deposit a second fluid into one or more wells 40 of the micro-well plate 12 as shown in FIG. 10C as the micro-well plate 12 moves through the fluid droplet ejection devices 14B from a starting position to a terminal position. Upon completion of the deposition of the second fluid into one or more wells 40 of the well plate 12, the fluid droplet ejection device 14B is deactivated and the micro-well plate 12 is transported out of the digital dispense system 10 in the direction of arrow 44 as shown in FIG. 10D.

In an automatic system for moving the micro-well plate 12 from one fluid droplet ejection device 14A to the next fluid droplet ejection device 14B, plurality of sensors may be used to determine the position of the micro-well plate 12 as the well plate 12 enters each fluid droplet ejection device 14A and 14B and is indexed through the fluid droplet ejection devices 14A and 14B during fluid deposition onto the well plate 12. For example, a first sensor 46A and a first receiver 48A therefor may be used to determine when a first end 50 of the micro-well plate 12 enters the fluid droplet ejection device 14A so that the sample tray transportation mechanism may be activated to index the well plate 12 through the fluid droplet ejection device 14A as fluid is ejected onto the well plate 12. When a second end 52 of the well plate 12 reaches a second sensor 54A and second receiver 56A therefor, fluid droplet ejection is terminated in the fluid droplet ejection device 14A and the micro-well plate 12 is transported to the second fluid droplet ejection device 14B thereby activating first sensor 46B and second receiver 48B therefor so that the well plate 12 may be indexed through the fluid droplet ejection device 14B as shown in FIG. 10B.

The sensors 46A-B and 54A-B may be alike or different and may be selected from laser sensors, air pressure sensors, ultrasonic sensors, infrared sensors, charge-coupled device (CCD) cameras, complementary metal oxide semiconductor (CMOS) cameras and the like. The sensors 46A-B and 54A-B may be continuously activated or intermittently activated for a predetermined period of time as the well plate 12 moves through the fluid droplet ejection devices 14A-B.

Figure 11:
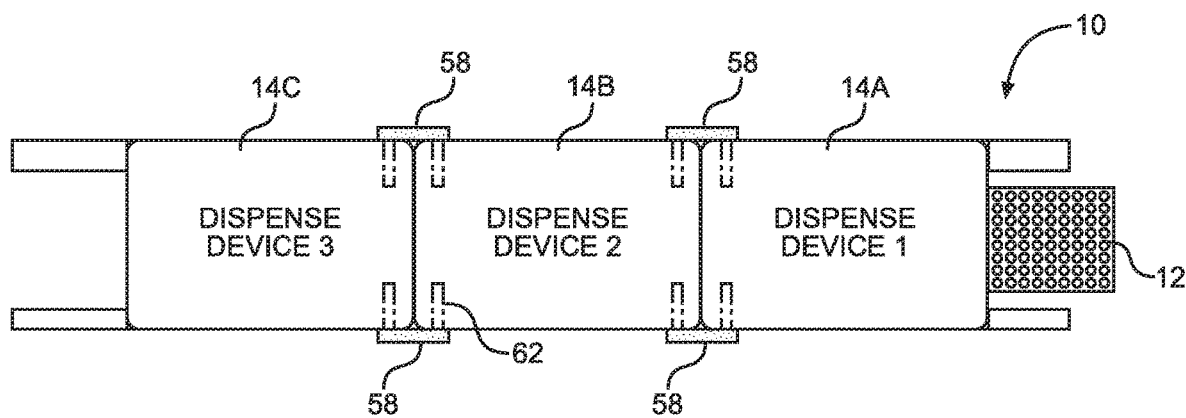
FIG. 11 is a schematic illustration, not to scale, of fluid droplet ejection devices clamped together for the digital dispense system of FIG. 1.
Figure 12:
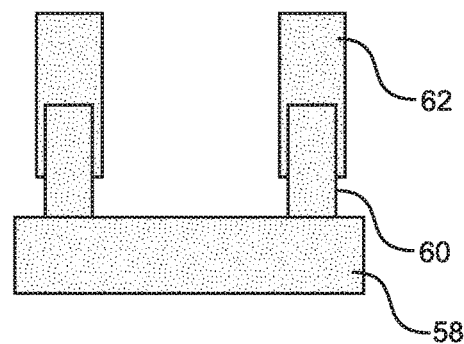
FIG. 12 is a plan view not to scale, of a clamp for insertion in slots in the fluid droplet ejection devices of FIG. 11 to interconnect the fluid droplet ejection devices.
Figure 13:
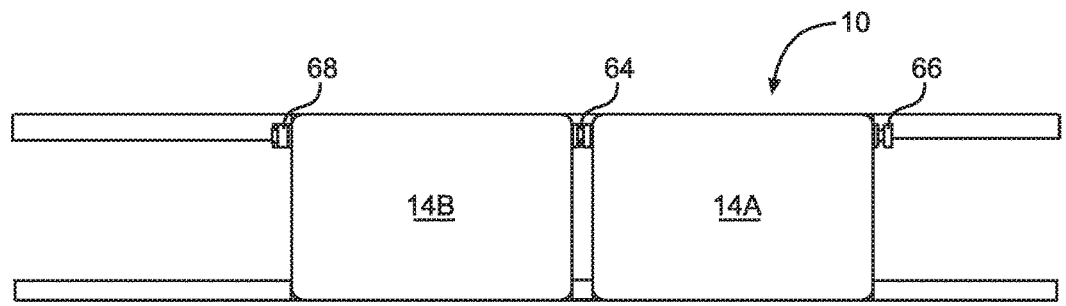
FIG. 13 is a schematic illustration, not to scale, of fluid droplet ejection devices interconnected by a connection device according to an alternative embodiment of the disclosure.
Figure 14:
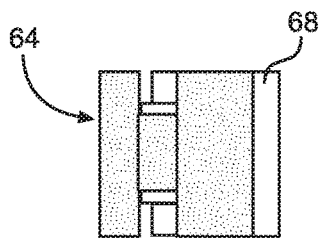
FIG. 14 is a top plan view, not to scale, of male and female connectors for interconnecting adjacent digital dispense devices according to FIG. 13.

As set forth above, the fluid droplet ejection devices 14A-C may be separate from one another or may be interconnected to one another. Accordingly when the fluid droplet ejection devices 14A-14C are interconnected with one another, a clamping device such as a U-shaped connector 58 (FIGS. 11-12) may be used to mechanically and electrically connect the fluid droplet ejection devices 14A-C to one another. The U-shaped connector 58 has legs 60 that are adapted to be disposed into slots 62 in adjacent fluid droplet ejection devices 14A-C to rigidly connect the devices 14A-C to one another. Other connectors may be used to clamp two or more fluid droplet devices 14 to one another and/or to electrically connect two or more fluid droplet ejection devices 14 to one another.

Figure 15A:
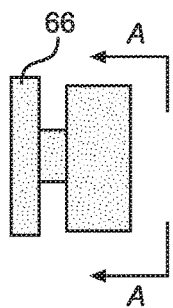
FIG. 15A is a top view, not to scale, of a male connector for interconnecting adjacent digital dispense devices according to FIG. 13.
Figure 15B:
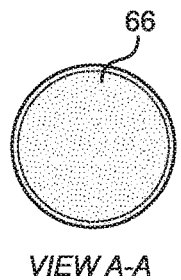
FIG. 15B is a front view A-A, not to scale, of the male connector of FIG. 15A.
Figure 16A:
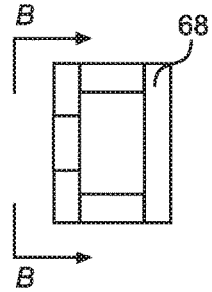
FIG. 16A is a top view, not to scale, of a female connector for interconnecting adjacent digital dispense devices according to FIG. 13.
Figure 16B:
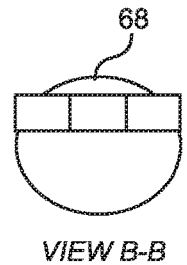
FIG. 16B is a front view B-B, not to scale, of the female connector of FIG. 16A.

In another embodiment, illustrated in FIGS. 13, 14, 15A-B and 16A-B, an alternative interconnection device 64 may be used to mechanically and electrically connect adjacent fluid droplet ejection devices 14A and 14B to one another. The interconnection device includes a male component 66 and an interlocking female component as shown in more detail in FIGS. 14-16. FIG. 15A is a top view of the male connector 66 and FIG. 15B is a front view of the male connector 66. FIG. 16A is a top view of the female connector 68 and FIG. 16B is a front view of the female connector 66.

Accordingly, FIGS. 11-16 are provided for illustration purposes and are not intended to be exhaustive of means or devices for interconnecting the fluid droplet ejection devices 14 to one another. In view of the clamped configuration shown in FIGS. 11 and 13, the micro-well plate 12 may be transported continuously through the devices 14A-C using the transportation system described below.

Figure 17A:
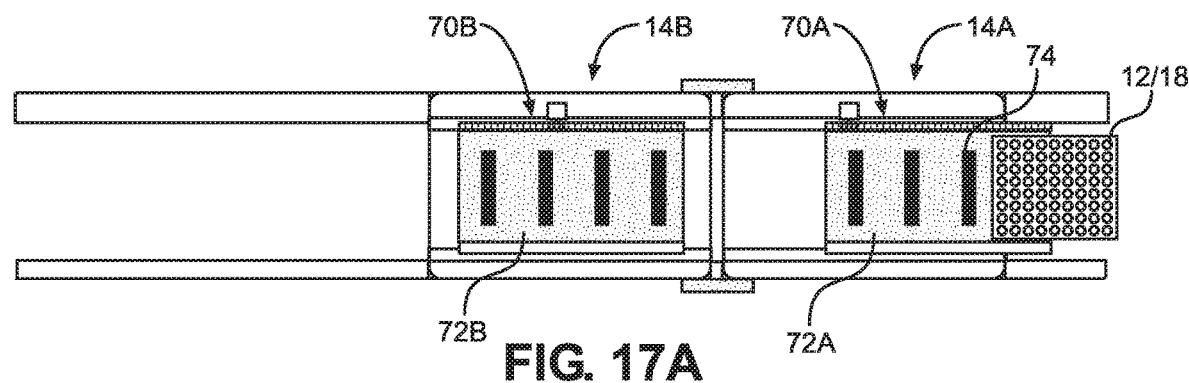
FIGS. 17A-17B are schematic illustrations, not to scale, of a transportation system used with the digital dispense system of FIG. 1 to move a micro-well plate through the digital dispense system.
Figure 17B:
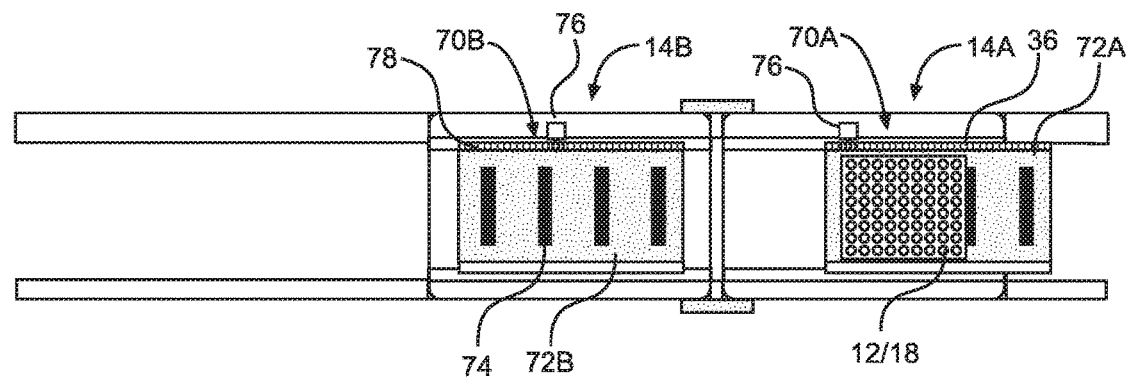
Figure 18:
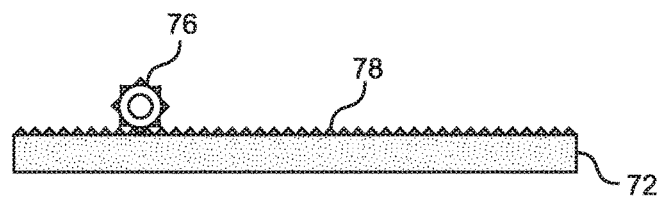
FIG. 18 is a side elevational view, not to scale, of a stepping motor and triangular teeth for moving micro-well plate through the digital dispense system of FIG. 1.

With reference to FIGS. 17A-19D, there is illustrated a transportation system for moving a micro-well plate 12 through a series of interconnected fluid droplet ejection devices 14 as described above. For example, FIG. 17A is a schematic cut-away plan view of the sample tray translation mechanisms 70A and 70B for interconnected fluid droplet ejection devices 14A-14B. The translation mechanisms 70A and 70B each include a roller conveyor 72A-72B that contain a two or more rollers 74 for moving the sample tray 18 containing the micro-well plate 12 into position within each of the fluid droplet ejection devices 14, as described above with reference to FIGS. 10A-D.

Figure 19A:
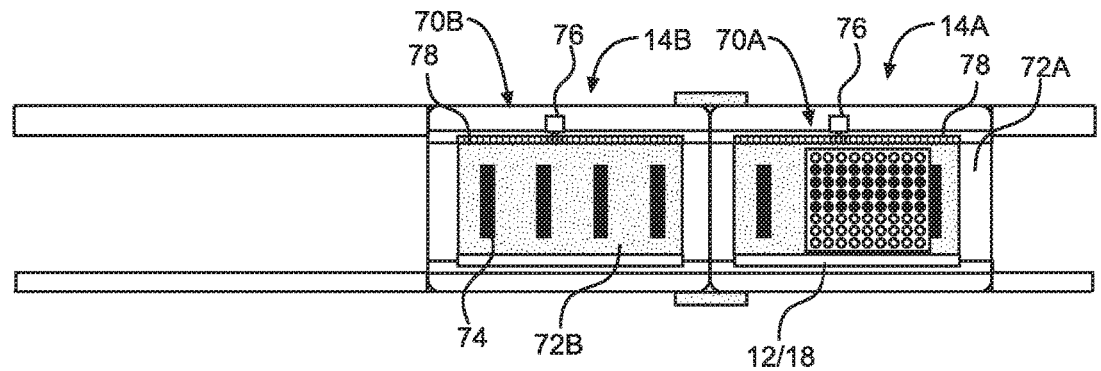
FIGS. 19A-19D are schematic illustrations, not to scale, of the use of the transportation system of FIGS. 17A-18 as a micro-well plate is moved through the digital dispense system of FIG. 1
Figure 19B:
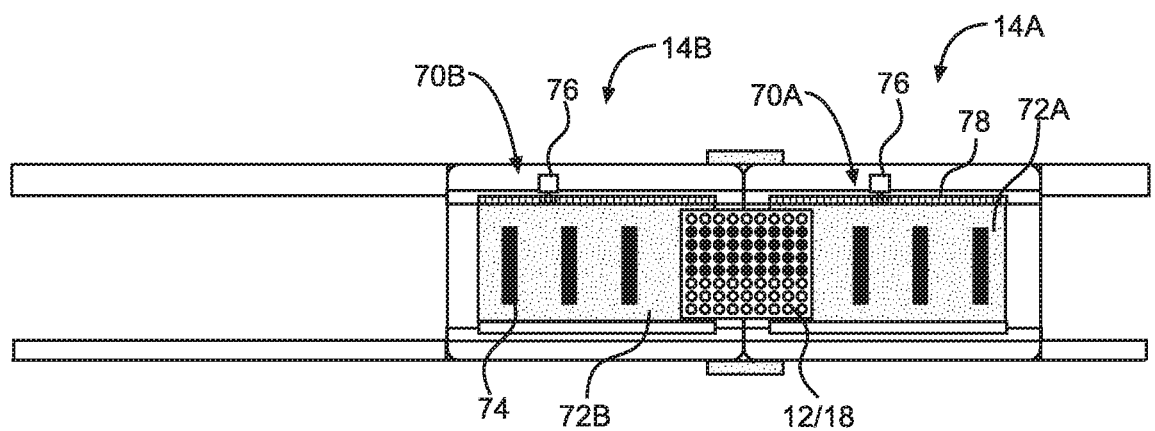
Figure 19C:
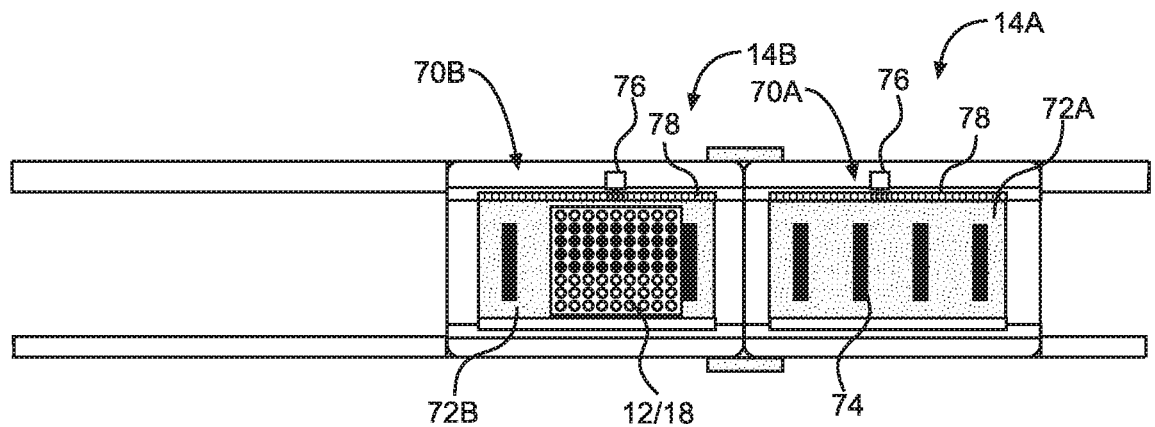
Figure 19D:
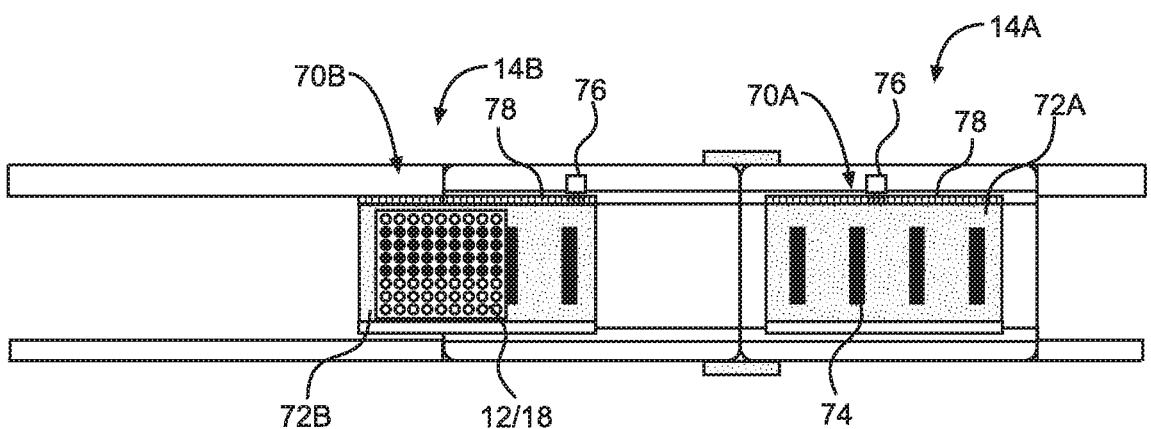

A stepping gear motor 76 (FIG. 18) then engages triangular teeth 78 a top, bottom or side of the roller conveyor 72 to move the conveyor from a first position for engaging a sample tray 18 containing a micro-well plate 12 (FIGS. 17A-B) to a second position (FIG. 19A) for indexing a sample tray 18 and micro-well plate 12 through the first fluid ejection device 14A by means of the triangular teeth 36 and a separate stepping motor (not shown) that engages the teeth 36. Once the first fluid is finished being deposited into the wells 40 of the micro-well plate 12, the stepping motor 76 again engages the triangular teeth 78 to move the first roller conveyor 72A to adjacent an entrance of the second fluid ejection device 14B as shown in FIG. 19B. Roller conveyor motors 80 (FIG. 20) for roller conveyors 72A and 72B are then activated to move the sample tray 18 from an exit of the first fluid ejection device 14A into position for fluid ejection into the wells of the micro-well plate 12 in the second fluid ejection device 14B as shown in FIG. 19C. Once deposition of the second fluid is complete, the stepping motor 76 is engaged again to move the conveyor 72B toward the exit of the second fluid ejection device 14B so that the sample tray 18 and micro-well plate 12 can be sent to another fluid ejection device 14 or to a final station for storage or analysis. A bottom view of the roller conveyor 72 is illustrated in FIG. 20 and includes a plurality of rollers 74 driven by a single gear motor 80 and drive belts 82.

In order to securely guide the sample tray 18 through the fluid droplet ejection devices 14, a pair of opposing guides 84 may be used to capture triangular shaped appendages 86 on the sample tray 18 as shown in FIGS. 21A and 21B. The opposing guides 84 are well lubricated so that the sample tray 18 smoothly engages the guides 84 as the sample tray 18 is advanced to the second position (FIG. 19A) described above. In an alternative embodiment, the guides 84 engage and clamp the triangular appendages 86 to securely position the tray 18 within the device 14 during droplet ejection into the micro-well plate 12. In the alternative embodiment, a sensor may activate a solenoid to cause the guides 84 to clamp the appendages 86 of the sample tray 18.

As set forth above, embodiments of the disclosure provide a highly accurate dispensing system 10 that has the ability to provide a high degree of customizable workflow as well as high speed production of micro-well plates for analysis. Accordingly, the dispense system 10 described above may provide an automated system for micro-well plate preparation is effective to reduce errors in the analytical procedures. The automated system 10 may also reduce the amount of time needed to perform many common micro-well plate tasks due to automation of subtasks and a reduction of the amount of human interaction.

Figure 22:
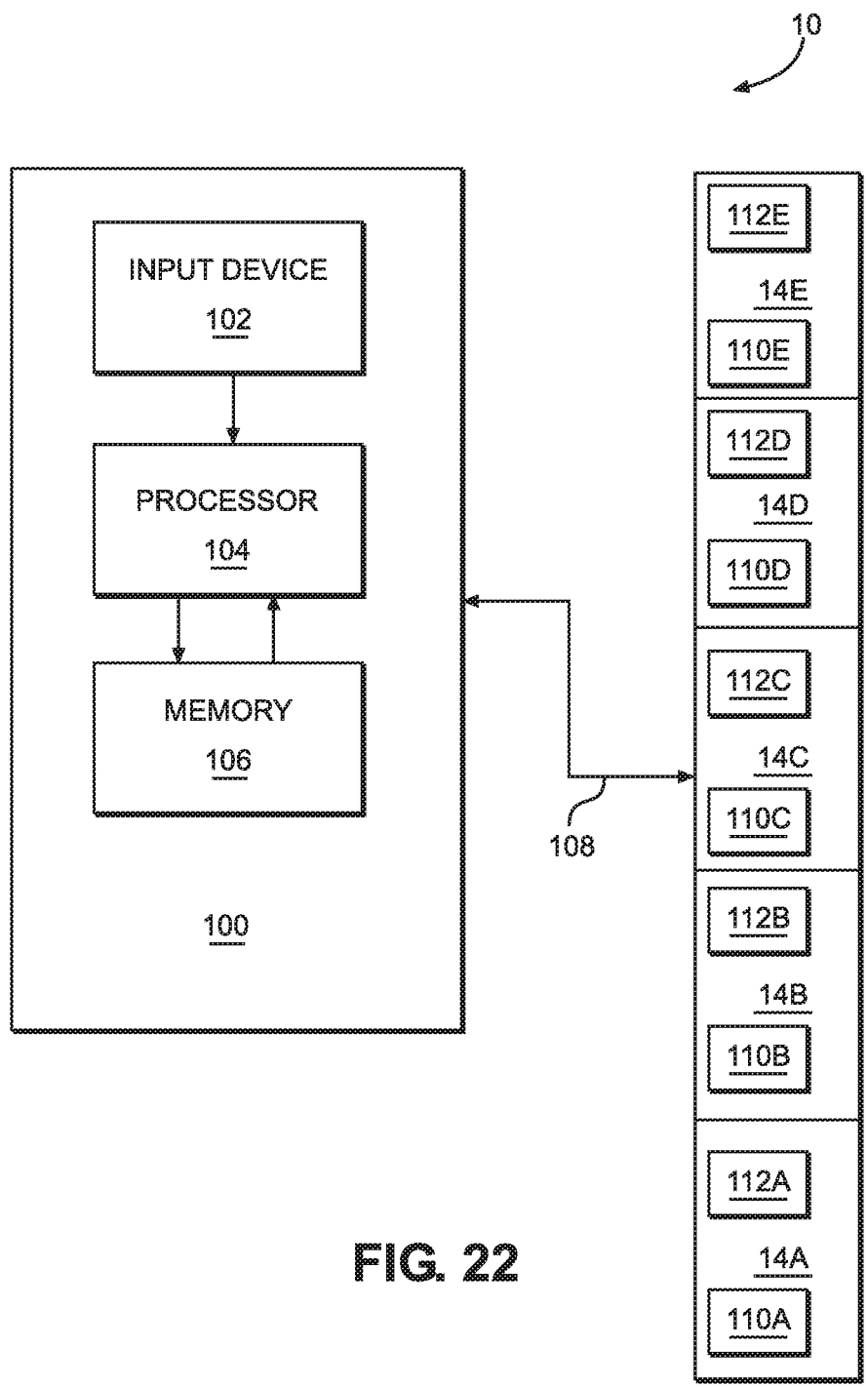
FIG. 22 is a schematic illustration of a control scheme for the digital dispense system of FIG. 1.

Accordingly, the entire digital dispense system 10 may be controlled by a central processing unit 100 (FIG. 22), such as a desktop or laptop computer containing an input device 102, a processor 104, and a memory 106. Since each of the fluid droplet ejection devices 14 are connected to one another, a single input/output signal 108 may be provided to the central processing unit 100. In some embodiments, instead of a hard wire connection between each adjacent digital dispense device 14, a wireless communication device including a sending unit 110 and a receiver 202112 may be included to send and receive communication signals from the adjacent digital dispense device.

Figure 23:
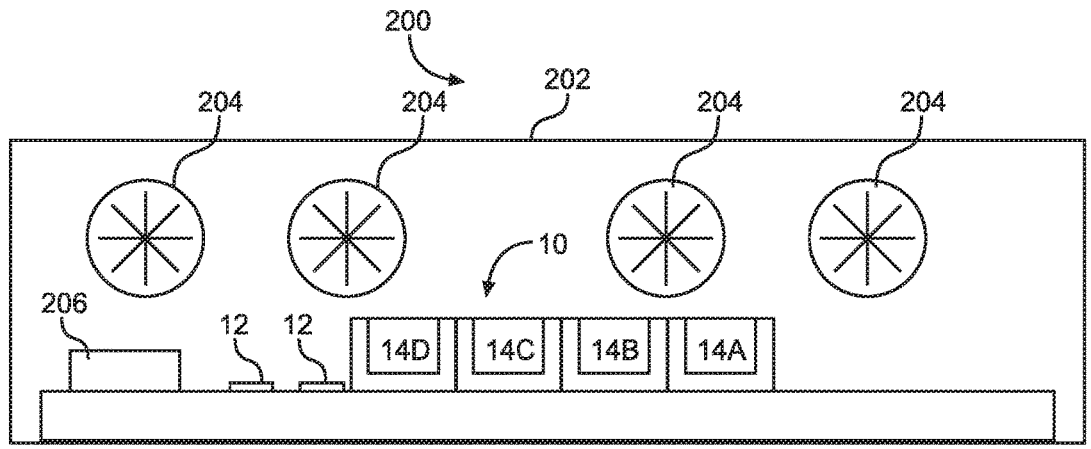
FIG. 23 is a schematic illustration of a portable system for processing samples in a controlled environment using the digital dispense system of FIG. 1.

In some embodiments, the digital dispense system 10 may be used in a portable clean room apparatus 200 as shown in FIG. 23. Because the individual fluid droplet ejection devices 14A-14D of the digital dispense system 10 are relatively compact and can be interconnected together to process a micro-well plate 12 as described above, the entire digital dispense system 10 may be enclosed in a plastic glove box 202 having access ports 204 for a user's hands. Multiple samples in the wells 40 of the well plates 12 may be processed through the digital dispense system 10, for example at a crime scene, and then without removing the processed samples from the glove box 202, may be sealed in a bag sealer 206. The entire portable clean room apparatus 200 may therefore preserve the integrity and purity of crime scene samples, and initiate sample analysis adjacent to the crime scene without having to transport samples back to a centrally located lab to begin sample analysis. It will be appreciated that the portable apparatus 200 described above may be used for a variety of other applications that require immediate sample analysis to obtain the most reliable results.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A digital dispense system for preparing and analyzing a plurality of samples, comprising:
    two or more rectangular-prism-shaped boxes disposed in series along a production path, each of the two or more rectangular-prism-shaped boxes containing a fluid droplet ejection cartridge containing at least one fluid to be dispensed, and a translation mechanism that is configured to move the fluid droplet ejection cartridge back and forth over a sample holder only in an x direction within each of the two or more rectangular-prism-shaped boxes, and
    a sample tray translation mechanism that is configured to move a sample tray along the production path in only a y direction orthogonal to the x direction from a starting position to a terminal position through each of the two or more rectangular-prism-shaped boxes in series.

2. The digital dispense system of claim 1, wherein the two or more rectangular-prism-shaped boxes are mechanically connected to one another, further comprising at least one clamp configured to clamp the two or more adjacent rectangular-prism-shaped boxes to one another in series along the production path.

3. The digital dispense system of claim 2, wherein each of the two or more rectangular-prism-shaped boxes is electrically connected to one another using a male connector on a first rectangular-prism-shaped box and female connector on an adjacent rectangular-prism-shaped box configured to provide logic information transfer between the two or more interconnected rectangular-prism-shaped boxes.

4. The digital dispense system of claim 1, wherein the sample tray translation mechanism comprises at least one track edge containing triangular teeth configured to intermesh with a gear of a stepping motor.

5. The digital dispense system of claim 1, wherein the sample tray moves between a pair of guidance tracks attached to the two or more rectangular-prism-shaped boxes configured to accurately guide the sample tray along the production path through the two or more rectangular-prism-shaped boxes.

6. The digital dispense system of claim 1, wherein each of the two or more rectangular-prism-shaped boxes contains a wireless transmitter and receiver configured to provide logic information transfer between the two or more rectangular-prism-shaped boxes.

7. The digital dispense system of claim 1, further comprising sensors along the production path configured to index the tray position as it moves through the two or more rectangular-prism-shaped boxes.

8. The digital dispense system of claim 1, further comprising a memory, a processor, and an input device, configured to control fluid droplet ejection from the fluid droplet ejection cartridge.

9. A method for preparing and analyzing a plurality of samples in a micro-well plate, comprising:
    providing a digital dispense system disposed in series along a production path for preparing and analyzing the plurality of samples, the digital dispense system comprising two or more rectangular-prism-shaped boxes, each rectangular-prism-shaped box containing a fluid droplet ejection cartridge containing at least one fluid to be dispensed, and a translation mechanism for moving the fluid droplet ejection cartridge back and forth over a sample holder only in an x direction, and
    providing a sample tray translation mechanism for moving a sample tray containing a plurality of sample wells along the production path only in a y direction orthogonal to the x direction from a starting position to a terminal position through each of the two or more rectangular-prism-shaped boxes;
    moving the sample tray along the production path through the two or more rectangular-prism-shaped boxes; and
    depositing fluid into the sample wells on the sample tray as the sample tray is moving through the two or more rectangular-prism-shaped boxes in series.

10. The method of claim 9 further comprising programming the two or more rectangular-prism-shaped boxes to deposit fluid into the plurality of sample wells on the sample tray as the sample tray moves along the production path.

11. The method of claim 9, wherein only one fluid is deposited from each of the two or more rectangular-prism-shaped boxes into the sample wells as the sample tray moves along the production path.

12. The method of claim 9, wherein the sample tray is moved sequentially along the production path from a first end to a second end of the production path.

13. The method of claim 9, wherein the digital dispense system includes a memory, a processor, and an input device, further comprising: (a) inputting a droplet amount and droplet locations on the sample tray to the memory using the input device, (b) activating the processor to eject first fluid droplets to the droplet locations within a first rectangular-prism-shaped box, (c) indexing the sample tray along the production path to a second fluid droplet, (d) activating the processor to eject second fluid droplets to the droplet locations within a second rectangular-prism-shaped box, (e) repeating steps (b)-(d) for each of the two or more rectangular-prism-shaped boxes along the production path, and (f) terminating the droplet ejection procedure when the tray reaches a terminal end of the production path.

14. A portable sample analysis laboratory comprising a glove box enclosure containing a digital dispense system and a bag sealer configured for micro-well plate process and analysis, the digital dispense system comprising:
    two or more interconnected rectangular-prism-shaped boxes connected to one another in series along a production path, each rectangular-prism-shaped box containing a fluid droplet ejection cartridge containing at least one fluid to be dispensed, and a translation mechanism configured to move the fluid droplet ejection cartridge back and forth over a sample holder in only an x direction, and a sample tray translation mechanism configured to move a sample tray along the production path only in a y direction orthogonal to the x direction from a starting position to a terminal position through the two or more interconnected rectangular-prism-shaped boxes.

15. The portable sample analysis laboratory of claim 14, further comprising at least one clamp configured to clamp the two or more adjacent rectangular-prism-shaped boxes to one another in series along the production path.

16. The portable sample analysis laboratory of claim 14, wherein the sample tray translation mechanism comprises at least one track edge containing triangular teeth configured to intermesh with a gear of a stepping motor.

17. The portable sample analysis laboratory of claim 14, wherein the sample tray moves between a pair of guidance tracks attached to the two or more interconnected rectangular-prism-shaped boxes wherein the pair of guidance tracks are configured to accurately guide the sample tray along the production path through the two or more interconnected rectangular-prism-shaped boxes.

18. The portable sample analysis laboratory of claim 14, wherein each of the two or more interconnected rectangular-prism-shaped boxes is electrically connected using a male connector on a first rectangular-prism-shaped box and female connector on an adjacent rectangular-prism-shaped box configured to provide logic information transfer between the two or more interconnected rectangular-prism-shaped boxes.

19. The portable sample analysis laboratory of claim 14, wherein each of the two or more interconnected rectangular-prism-shaped boxes contains a wireless transmitter and receiver configured to provide logic information transfer between the two or more interconnected rectangular-prism-shaped boxes.

20. The portable sample analysis laboratory of claim 14, further comprising sensors along the production path configured to index the tray position as it moves through the two or more interconnected rectangular-prism-shaped boxes.

* * * * *